(12) United States Patent
Schirwitz et al.

(10) Patent No.: US 11,912,865 B2
(45) Date of Patent: Feb. 27, 2024

(54) HEAT-CONDUCTING POLYCARBONATES HAVING IMPROVED FLAME PROTECTION BY MEANS OF BARIUM SULFATE

(71) Applicant: COVESTRO INTELLECTUAL PROPERTY GMBH & CO. KG, Leverkusen (DE)

(72) Inventors: Christopher Schirwitz, Leverkusen (DE); Tim Hungerland, Cologne (DE); Tanja Grueter-Reetz, Krefeld (DE); Helmut Kruells, Meerbusch (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 171 days.

(21) Appl. No.: 17/604,078

(22) PCT Filed: Apr. 9, 2020

(86) PCT No.: PCT/EP2020/060151
§ 371 (c)(1),
(2) Date: Oct. 15, 2021

(87) PCT Pub. No.: WO2020/212245
PCT Pub. Date: Oct. 22, 2020

(65) Prior Publication Data
US 2022/0220301 A1 Jul. 14, 2022

(30) Foreign Application Priority Data
Apr. 18, 2019 (EP) .................................. 19170116

(51) Int. Cl.
| C08L 69/00 | (2006.01) |
| C08K 3/34 | (2006.01) |
| C08K 3/30 | (2006.01) |
| C08K 5/42 | (2006.01) |
| C08G 64/04 | (2006.01) |
| C08J 3/00 | (2006.01) |
| C08K 3/22 | (2006.01) |
| C08L 51/06 | (2006.01) |

(52) U.S. Cl.
CPC .............. *C08L 69/00* (2013.01); *C08G 64/04* (2013.01); *C08J 3/005* (2013.01); *C08K 2003/2241* (2013.01); *C08K 2003/3045* (2013.01); *C08L 51/06* (2013.01); *C08L 2201/02* (2013.01)

(58) Field of Classification Search
None
See application file for complete search history.

(56) References Cited

U.S. PATENT DOCUMENTS

| 4,840,995 A * | 6/1989 | Tamura ................... C08L 67/02 525/147 |
| 2014/0303296 A1* | 10/2014 | Inazawa ................... C08K 3/34 524/165 |

FOREIGN PATENT DOCUMENTS

| CN | 102459463 A | 5/2012 |
| CN | 103890092 A | 6/2014 |
| WO | WO2010147015 | * 12/2010 |
| WO | 2013045544 A1 | 4/2013 |
| WO | 2017/216678 A1 | 12/2017 |
| WO | 2018/037037 A1 | 3/2018 |

OTHER PUBLICATIONS

International Search Report and Written Opinion received for PCT Patent Application No. PCT/EP2020/060151, dated Jun. 19, 2020, 14 pages (6 pages of English Translation and 8 pages of Original Document).

* cited by examiner

*Primary Examiner* — David J Buttner
(74) *Attorney, Agent, or Firm* — The Webb Law Firm

(57) ABSTRACT

The present invention relates to a thermoplastic composition comprising at least one aromatic polycarbonate, talc, at least one anhydride-modified alpha-olefin polymer, at least one organic flame retardant selected from: fluoropolymer-containing anti-drip agents, fluorinated sulfonic acid salts, organic phosphoric acid esters, phosphazenes or mixtures of at least two of the abovementioned agents and barium sulfate. The invention further relates to a production process for such a composition and to a molded article producible from this composition.
The composition contains barium sulfate in an amount of ≥3% by weight based on the total weight of the composition. ≥5% by weight is preferred.

13 Claims, No Drawings

HEAT-CONDUCTING POLYCARBONATES HAVING IMPROVED FLAME PROTECTION BY MEANS OF BARIUM SULFATE

CROSS-REFERENCE TO RELATED APPLICATIONS

This application is a national stage applicate (under 35 U.S.C. § 371) of PCT/EP2020/060151, filed Apr. 9, 2020, which claims benefit of European Application No. 19170116.8, filed Apr. 18, 2019, both of which are incorporated herein by reference in their entirety.

The present invention relates to a thermoplastic composition comprising at least one aromatic polycarbonate, talc, at least one anhydride-modified alpha-olefin polymer, at least one organic flame retardant selected from: fluoropolymer-containing anti-drip agents, fluorinated sulfonic acid salts, organic phosphoric acid esters, phosphazenes or mixtures of at least two of the abovementioned agents and barium sulfate. The invention further relates to a production process for such a composition and to a molded article producible from this composition.

The reinforcing of polycarbonates by the filler talc is desirable for many applications on account of the thermal conductivity of talc, especially when electrical conductivity is not desired. However, the addition of talc to molten polycarbonates can result in degradation of the polymer chains which is ultimately reflected in poorer mechanical properties of the resulting polycarbonate molded articles.

WO 2018/037037 A1 discloses a composition obtained by mixing at least components A) to C), wherein A) is polycarbonate, B) is unsized talc and C) is at least one anhydride-modified alpha-olefin polymer having an acid number of at least 30 mg KOH/g and an average molecular weight $M_W$ of 4000 to 40 000 g/mol, wherein before mixing the amounts of B) and C) are matched to one another such that per 10 parts by weight of component B) 0.10 to 1.4 parts by weight of component C) are employed and wherein the composition is free from polyesters and graft polymers. According to this publication contemplated inorganic fillers especially include titanium dioxide, generally in an amount of 0% to 2.5% by weight based on the sum of the overall composition, or barium sulfate.

The compositions known from WO 2018/037037 A1 exhibit an improved thermal conductivity through the use of the filler talc. Through the use of an amount of a specific maleic anhydride-modified olefin wax that is matched to the employed talc amount, the polycarbonate is stabilized such that basic polymer degradation is largely inhibited while simultaneously achieving advantageous mechanical properties. For example a good Charpy notched impact strength according to IS0179/1eU and a good multiaxial impact strength according to DIN EN ISO 6603-2:2002 are achieved. However, with a view to increasing flame retardancy further, the addition of such olefin waxes is disadvantageous.

It is an object of the present invention to provide thermally conductive polycarbonate compositions having improved flame retardancy. It is a particular object of the invention to develop compositions, for example according to WO 2018/037037 A1, in such a way that they may be utilized in applications having particular flame retardancy requirements. Such applications may be constituents of electrical components or housings for electrical components. The profile of requirements may include that the molding materials have a UL94V score of V0 at a wall thickness of not more than 1.5 mm and a ULSV score of 5VA at a wall thickness of not more than 2.0 mm.

The good heat resistance of the thermoplastic compositions known from WO 2018/037037 A1 shall advantageously not be excessively reduced by the type and amount of flame retardant. A Vicat temperature (Vicat B, ISO 306:2014-3, heating rate 50 K/h) of 115° C. or more could be retained for example which is especially advantageous for the use of the molding materials as constituents of electrical components or as a housing for electrical components.

The object is achieved according to the invention by a composition as claimed in claim 1. The invention further relates to a production process according to claim 11 and a molding according to claim 13. Advantageous developments are specified in the dependent claims. They may be combined as desired unless the opposite is clear from the context.

A thermoplastic composition according to the invention comprises:

A) at least one aromatic polycarbonate;
B) talc;
C) at least one anhydride-modified alpha-olefin polymer having an acid number of ≥30 mg KOH/g and an average molecular weight MW of ≥4000 to ≤40 000 g/mol,
wherein the average molecular weight MW is determined by gel permeation chromatography in ortho-dichlorobenzene at 150° C. with polystyrene calibration and the acid number is determined by potentiometric titration with alcoholic potassium hydroxide solution according to DIN ISO 17025:2005;
FR) at least one organic flame retardant selected from: fluoropolymer-containing anti-drip agents, fluorinated sulfonic acid salts, organic phosphoric acid esters, phosphazenes or mixtures of at least two of the abovementioned agents;
D) at least one inorganic compound distinct from talc.

It is further provided that the composition contains barium sulfate in an amount of ≥3% by weight based on the total weight of the composition; the composition contains alkaline earth metal sulfates distinct from barium sulfate in an amount of ≥0% by weight to ≤25% by weight based on the total weight of the alkaline earth metal sulfates present in the composition; the composition contains organic phosphoric acid esters in an amount of ≥0% by weight to ≤7.5% by weight based on the total weight of the composition and the composition contains ≥0.5% by weight based on the total weight of the composition of fluoropolymer-containing anti-drip agents. In the case where the composition contains ≥0.1% by weight based on the total weight of the composition of fluorinated sulfonic acid salts, the content of fluoropolymer-containing anti-drip agents is ≥0.7% by weight based on the total weight of the composition.

The inventors have surprisingly found that barium sulfate may be considered a flame retardancy synergist above a certain amount. The previous advantageous properties of the talc-filled polycarbonate compositions are largely retained.

The composition contains preferably ≥4% by weight and more preferably ≥5% by weight of barium sulfate in each case based on the total weight of the composition. Possible upper limits for the content of barium sulfate are for example ≤20% by weight or ≤15% by weight in each case based on the total weight of the composition.

On account of its relatively high purity the employed barium sulfate is preferably a synthetic barium sulfate obtained from the reaction of barium carbonate with sulfuric acid. The "blanc fixe" qualities are more preferred. The D50 value for the particle size distribution (sedimentation analysis) may be ≥7 to ≤9 µm for example.

For reasons of process simplification it is advantageous when the composition contains no further alkaline earth metal sulfates in addition to barium sulfate. When further alkaline earth metal sulfates such as calcium sulfate are added, their proportion shall be measured such that it is 0% by weight to ≤25% by weight (preferably ≥0% by weight to ≤15% by weight, more preferably ≥0% by weight to ≤5% by weight) based on the total weight of the alkaline earth metal sulfates present in the composition.

The composition contains organic phosphoric acid esters in an amount of ≥0% by weight to ≤7.5% by weight, preferably of ≥0% by weight to ≤5% by weight, based on the total weight of the composition. The phosphoric acid esters may be flame retardants such as BDP (bisphenol A bisdiphenyl phosphate and oligomers thereof) or stabilizers such as mono-, di- and trihexyl phosphate, triisoctyl phosphate and trinonyl phosphate.

The composition further contains ≥0.5% by weight based on the total weight of the composition of fluoropolymer-containing anti-drip agents. This may be for example PTFE or, preferably, blends of PTFE with SAN polymers. The content of PTFE in the SAN polymer is for example in the range from 45% to 55% by weight based on the total weight of the anti-drip agent.

In the case where the composition contains ≥0.1% by weight, preferably ≥0.2% by weight, based on the total weight of the composition of fluorinated sulfonic acid salts, the content of fluoropolymer-containing anti-drip agents is ≥0.7% by weight, preferably ≥0.8% by weight, based on the total weight of the composition. One example of such a fluorinated sulfonic acid salt is potassium perfluorobutanesulfonate ("C4 salt").

Component A

Component A is at least one aromatic polycarbonate. It is thus also possible to use mixtures as component A. For the purposes of the present invention, polycarbonates are either homopolycarbonates or copolycarbonates; the polycarbonates can, as is known, be linear or branched. The polycarbonates are produced in a known manner from dihydroxyaryl compounds, carbonic acid derivatives, and optionally chain terminators and branching agents.

Preferred dihydroxyaryl compounds are selected from at least one from the group of 4,4'-dihydroxybiphenyl, 2,2-bis(4-hydroxyphenyl)propane (bisphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl)propane, dimethylbisphenol A, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,1-bis(3,5-di methyl-4-hydroxyphenyl)-p-diisopropylbenzene and 1,1-bis(4-hydroxyphenyl)-3,3,5-trimethylcyclohexane.

Examples of suitable carbonic acid derivatives are phosgene or diphenyl carbonate. Suitable chain terminators that may be used in the production of the polycarbonates used in accordance with the invention are monophenols. Suitable monophenols are for example phenol itself, alkylphenols such as cresols, p-tert-butylphenol, cumylphenol and mixtures thereof. Suitable branching agents are the trifunctional or more than trifunctional compounds known in polycarbonate chemistry, in particular those having three or more than three phenolic OH groups.

Particularly preferred polycarbonates are the homopolycarbonate based on bisphenol A, the homopolycarbonate based on 1,1-bis(4-hydroxyphenyl)-3,3,5-trimethylcyclohexane and copolycarbonates based on the monomers bisphenol A and 1,1-bis(4-hydroxyphenyl)-3,3,5-trimethylcyclohexane, bisphenol A with 4,4'-dihydroxybiphenyl (DOD) or bisphenol A with 4,4'-dihydroxy-3,3',5,5'-tetra(tert-butyl)biphenyl. In the copolycarbonates the proportion of the comonomer such as DOD may be for example 11 mol % to 34 mol % and in particular 26 mol % to 32 mol %.

Component B

Talc in the context of the present invention is preferably a talc of essentially the same chemical composition, particle diameter, porosity and/or BET surface area, or a talc mixture.

Talc is generally a phyllosilicate. It can be described as magnesium silicate hydrate having the general chemical composition $Mg_3[Si_4O_{10}(OH)_2]$. However, different types of talc contain different impurities, and so there may be deviations from this general composition.

The employed talc or the talc mixture for producing the composition according to the invention is preferably unsized. In the context of the present invention, a size is considered to be a controlled (chemi- or physisorbed) enrichment of molecules at the surface. Unsized talc is thus non-surface-treated talc, meaning that, after the talc particles having the desired particle diameter have been recovered and optionally subjected to compaction, the talc preferably has not been subjected to any further process step that alters the surface of the talc in a controlled manner by chemisorption and/or physisorption. However, this does not rule out the unintentional arrival of impurities, dust or similar particles on parts of the surface during the further handling of the talc, provided that the surface of the talc does not lose its properties to any significant degree, especially in relation to the pH. However in the production of the composition according to the invention the talc is only sized by the mixing with component C.

The talc preferably has a pH of 8 to 10, more preferably 8.5 to 9.8, even more preferably 9.0 to 9.7, where the pH is determined according to EN ISO 787-9:1995. It should be noted that EN ISO 787-9:1995 also mentions the option of addition of ethanol or other organic solvents to improve the dispersion of the solid to be analysed. Preference is given in accordance with the invention to using distilled water only for determination of the pH according to EN ISO 787-9: 1995.

Component B) preferably has an iron(II) oxide and/or iron(III) oxide content of 0.2% to 2.5% by weight, more preferably 0.3% to 2.3% by weight, most preferably from 0.3% to 2.0% by weight. This content is preferably measured by x-ray fluorescence or atomic absorption spectroscopy. It has been found that the iron oxide content in the talc has an influence on the degree of degradation of the polycarbonate. Within the range of iron oxide contents specified in accordance with the invention, particularly good results have been achieved in relation to the reduction in the degradation of the polycarbonate.

It is likewise preferable when component B) has an aluminum oxide content of 0.01% to 0.5% by weight, more preferably of 0.05% to 0.48% by weight, most preferably of 0.15% to 0.45% by weight.

Component B) preferably has a median particle diameter D50 of 0.01 to 10 μm, particularly preferably 0.25 to 10.00 μm, more preferably 0.5 to 10.00 μm, wherein the particle diameter D50 is determined by sedimentation analysis. The median D50 is understood by the person skilled in the art to mean an average particle diameter at which 50% of the particles are smaller than the defined value. The particle diameter D50 is preferably determined according to ISO 13317-3:2001.

Component B) preferably has a BET surface area of 7.5 to 20.0 $m^2/g$, more preferably of 9.0 to 15.0 $m^2/g$, most preferably 9.5 to 14.0 $m^2/g$. The determination of the surface area according to Brunauer, Emmett and Teller by means of gas adsorption is known per se to those skilled in the art. The BET surface area is preferably determined according to ISO 4652:2012. This preferred BET surface area is particularly preferably linked to the above-described median particle diameter D50 of the talc. It has been found that, in the case of such a combination, the component B used in accordance with the invention is optimally matched to the component C used in accordance with the invention. The specific acid number and molar mass of component C can minimize the degradation of the polycarbonate caused by component B, since the pores of the talc under these conditions, in particular, are also accessible to the wax C.

It is particularly preferable when the talc has a content of >96% by weight, more preferably >97% by weight, most preferably >98% by weight.

It is likewise preferable when the talc has an ignition loss at 1050° C. of 5.0% to 7.0% by weight, more preferably of 5.2 to 6.5% by weight and most preferably of 5.3 to 6.2% by weight. The ignition loss is preferably determined by means of DIN51081:2002.

The talc or the talc mixture of component B is preferably in compacted form.

Component C

Component C in the context of the present invention is an anhydride-modified alpha-olefin polymer having an acid number of at least 30 mg KOH/g and an average molecular weight $M_W$ (weight-average) of 4000 to 40 000 g/mol. It may also be a mixture of different polymers which together fulfill the features of component C.

A preferred anhydride as a unit for modification is an unsaturated carboxylic anhydride preferably selected from at least one selected from the group consisting of maleic anhydride, phthalic anhydride, fumaric anhydride, itaconic anhydride. Particular preference is given to maleic anhydride.

The anhydride-modified alpha-olefin polymer is preferably rubber-free.

The acid number of the wax of component C employed according to the invention is at least 30 mg KOH/g. The acid number is preferably 30 to 110 mg KOH/g, more preferably 40 to 95 mg KOH/g. The acid number is determined by potentiometric titration with alcoholic potassium hydroxide solution according to DIN ISO 17025:2005.

The average molecular weight $M_W$ of the anhydride-modified alpha-olefin polymer is 4000 to 40 000 g/mol, preferably 4000 to 32 000 g/mol, more preferably 4800 to 25 000 g/mol. The molecular weight $M_W$ is determined by means of gel permeation chromatography in ortho-dichlorobenzene at 150° C. with polystyrene calibration. The value reported here is preferably the average from a duplicate determination.

In the case of smaller molecular weights of 4000 to 10 000 g/mol the acid number is preferably 30 to 65 mg KOH/g, more preferably 40 to 60 mg KOH/g. The molecular weight for the acid number of 30 mg to 65 mg or 40 to 60 mg KOH/g specified in each case is particularly preferably 4500 to 8000 g/mol and especially 5000 to 7000 g/mol.

In the case of larger molecular weights of 12 000 to 40 000 g/mol the acid number is preferably 30 to 100 mg KOH/g, especially 35 to 95 mg KOH/g. The molecular weight for the acid number of 30 mg to 100 mg or 35 to 95 mg KOH/g specified in each case is particularly preferably 12 000 to 32 000 g/mol and especially 15 000 to 25 000 g/mol, most preferably 17 500 to 23 000 g/mol.

The combination of the (minimum) acid number and molar mass of the wax C as specified above is suitable in order to optimize, in particular, the multiaxial impact resistance of molded articles produced from the compositions according to the invention.

The amount of component C results from the above-specified amounts per 10 parts by weight of component B. In the composition according to the invention the employed amounts of B and C are preferably matched to one another such that per 10 parts by weight of component B 0.10 to 1.4 parts of component C are employed. It is preferable to employ per 10 parts by weight of component B 0.2 to 1.2, particularly preferably 0.3 to 1.1, parts by weight of component C, very particularly preferably 0.4 to 1.0 parts by weight of component C, most preferably 0.6 to 0.8 parts by weight of component C.

Component FR

Component FR includes organic anti-drip agents and fire behavior-modifying organic compounds. In addition to the abovementioned anti-drip agents, fluorinated sulfonic acid salts and organic phosphoric acid esters, the definition of this component also includes phosphazenes.

Among the cyclic phosphazenes employable according to the invention it is preferable to employ those in which 3 to 5 structural units comprising the group P=N are present in the ring. Among the chain-shaped phosphazenes employable according to the invention it is preferable to employ those in which 3 to 25 structural units comprising the group P=N are present in the molecular chain.

It is especially particularly preferable to employ ring-shaped phenoxyphosphazenes such as are available for example from Fushimi Pharmaceutical Co. Ltd, Kagawa, Japan under the designation Rabitle® FP110 [CAS No. 1203646-63-2] or hexaphenoxycyclotriphosphazene [2,2,4,4,6,6-hexahydro-2,2,4,4,6,6-hexaphenoxytriazatriphosphorine CAS No. 1184-10-7].

The composition according to the invention may further contain customary additives such as heat stabilizers, mold release agents, antioxidants, UV absorbers, IR absorbers, antistats, optical brighteners, light scattering agents and colorants (including white pigments other than titanium dioxide which is already captured as component E).

In one embodiment the composition contains ≥3% by weight based on the total weight of the composition of organic phosphoric acid esters. This content is preferably ≥4% by weight to ≤6% by weight, more preferably ≥4.5% by weight to ≤5% by weight. Examples of the phosphoric acid esters are described hereinabove. Particularly preferred in this embodiment is a content of ≥4.5% by weight to ≤5% by weight of BDP.

In one further embodiment the composition contains ≥3% by weight based on the total weight of the composition of linear and/or cyclic phosphazenes. This content is preferably ≥4% by weight to ≤10% by weight, more preferably ≥5% by weight to ≤8% by weight. Examples of the phosphazenes are described hereinabove. Particularly preferred in this embodiment is a content of ≥5% by weight to ≤7.5% by weight of phenoxycyclophosphazene.

In a further embodiment the composition contains ≥0% by weight to ≤1% by weight, preferably ≤0.1% by weight, based on the total weight of the composition of oligomeric organic siloxanes and/or ≥0% by weight to ≤1% by weight, preferably ≤0.1% by weight, based on the total weight of the composition of halogen-free organic sulfones and/or halogen-free organic sulfonates and/or ≥0% by weight to ≤1% by weight, preferably ≤0.1% by weight, based on the total weight of the composition of boron nitride. The absence of the abovementioned substances in the composition is particularly preferred. Examples of the siloxanes are aromatic tetrasiloxanes such as octaphenyltetrasiloxane. One example of the sulfones and sulfonates is so-called KSS salt, a mixture of diphenyl sulfone, potassium diphenyl sulfone sulfonate and potassium diphenyl sulfone disulfonate.

In a further embodiment the composition contains at least one polycarbonate or copolycarbonate comprising units based on bisphenol A. As indicated hereinabove particularly preferred polycarbonates are the homopolycarbonate based on bisphenol A and copolycarbonates based on the monomers bisphenol A and 1,1-bis(4-hydroxyphenyl)-3,3,5-trimethylcyclohexane or bisphenol A with 4,4'-dihydroxydiphenyl (DOD).

In a further embodiment the anhydride-modified alpha-olefin polymer C) comprises ≥90.0% to ≤98.0% by weight of alpha-olefin polymer and ≥2.0% to ≤10.0% by weight of anhydride, wherein the reported % by weight values are based on the total weight of the anhydride-modified alpha-olefin polymer and sum to ≤100% by weight. It is preferable when the alpha-olefin polymer comprises:
i) 92.0-97.5% by weight, particularly preferably 94.0%-97.0% by weight, of alpha-olefin polymer and
ii) 2.5-8.0% by weight and particularly preferably 3.0-6.0% by weight of anhydride.

The olefinic portion i) of the alpha-olefin polymer is preferably characterized in that
the ethylene content is 80.0%-96.0% by weight, preferably 84.0%-92.0% by weight,
the propylene content is 2.0%-10.0% by weight, preferably 4.0%-8.0% by weight, and
the octene content is 2.0%-10.0% by weight, preferably 4.0%-8.0% by weight.

It is likewise preferable when the olefinic portion i) of the alpha-olefin polymer consists of propylene and/or ethylene. It is further preferable when the olefinic portion i) of the alpha-olefin polymer consists of propylene.

In a further embodiment the talc has a D50 value for the particle size distribution determined by sedimentation analysis (ISO13317-3:2001) of ≥0.5 to ≤10 βm. This value is preferably ≥0.6 to ≤2.5 βm.

In a further embodiment the composition comprises:
A) ≥50% to ≤75% by weight of aromatic polycarbonate;
B) ≥15% to ≤35% by weight of talc;
C) ≥0.5% to ≤3% by weight of anhydride-modified alpha-olefin polymer having an acid number of ≥30 mg KOH/g and an average molecular weight $M_W$ of ≥4000 to ≤40 000 g/mol,
wherein the average molecular weight $M_W$ is determined by gel permeation chromatography in ortho-dichlorobenzene at 150° C. with polystyrene calibration and the acid number is determined by potentiometric titration with alcoholic potassium hydroxide solution according to DIN ISO 17025:2005;
FR) ≥0.7% to ≤0.9% by weight of fluoropolymer-containing anti-drip agent in combination with ≥0.1% to ≤0.3% by weight of fluorinated sulfonic acid salt; or ≥0.4% to ≤0.6% by weight of fluoropolymer-containing anti-drip agent in combination with ≥3% to ≤5% by weight of organic phosphoric acid ester; or ≥0.4% to ≤0.6% by weight of fluoropolymer-containing anti-drip agent in combination with ≥3% to ≤10% by weight of linear or cyclic phosphazene;
D) ≥3% by weight to ≤10% by weight of barium sulfate;
E) ≥0% by weight to ≤3% by weight of titanium dioxide;
wherein the reported % by weight values are based on the total weight of the composition and sum to ≤100% by weight.

It is preferable when the composition comprises:
A) ≥52% to ≤70% by weight of aromatic polycarbonate;
B) ≥25% to ≤30% by weight of talc;
C) ≥1% to ≤2% by weight of anhydride-modified alpha-olefin polymer having an acid number of ≥30 mg KOH/g and an average molecular weight Mw of ≥4000 to ≤40 000 g/mol,
wherein the average molecular weight $M_W$ is determined by gel permeation chromatography in ortho-dichlorobenzene at 150° C. with polystyrene calibration and the acid number is determined by potentiometric titration with alcoholic potassium hydroxide solution according to DIN ISO 17025:2005;
FR) ≥0.7% to ≤0.9% by weight of fluoropolymer-containing anti-drip agent in combination with ≥0.1% to ≤0.3% by weight of fluorinated sulfonic acid salt; or ≥0.4% to ≤0.6% by weight of fluoropolymer-containing anti-drip agent in combination with ≥4% to ≤5% by weight of organic phosphoric acid ester; or ≥0.4% to ≤0.6% by weight of fluoropolymer-containing anti-drip agent in combination with ≥4% to ≤8% by weight of linear or cyclic phosphazene;
D) ≥5% by weight to ≤8% by weight of barium sulfate;
E) ≥0% by weight to ≤1.5% by weight of titanium dioxide;
wherein the reported % by weight values are based on the total weight of the composition and sum to ≤100% by weight.

In a further embodiment the composition comprises:
A) ≥52% to ≤55% by weight of aromatic polycarbonate having an average molecular weight Mw of 23 000 g/mol to 25 000, a softening temperature (VST/B 120 according to ISO 306:2014-3) of 145° C. to 150° C. and a melt-volume flow rate (MVR) according to ISO 1133:2012-03 of 18.0 cm$^3$/(10 min) to 20.0 cm$^3$/(10 min) at 300° C. and a 1.2 kg load;
B) ≥28% to ≤30% by weight of talc having a D50 value for the particle size distribution (sedimentation analysis) of ≥2 μm to ≤2.5 μm;
C) ≥1% to ≤2% by weight of anhydride-modified alpha-olefin polymer having an acid number of ≥75 to ≤80 mg KOH/g and an average molecular weight $M_W$ of ≥20 000 to ≤21 000 g/mol,
wherein the average molecular weight $M_W$ is determined by gel permeation chromatography in ortho-dichlorobenzene at 150° C. with polystyrene calibration and the acid number is determined by potentiometric titration with alcoholic potassium hydroxide solution according to DIN ISO 17025:2005;

FR) ≥0.4% to ≤0.6% by weight of fluoropolymer-containing anti-drip agent and ≥5% to ≤8% by weight of cyclic phosphazene;
D) ≥7% by weight to ≤8% by weight of barium sulfate;
E) ≥0% by weight to ≤1.2% by weight of titanium dioxide;
wherein the reported % by weight values are based on the total weight of the composition and sum to ≤100% by weight.

In a further embodiment the composition has at least two of the following properties:
a) the melt viscosity (ISO 11443:2014-04, 300° C., 1000 s$^{-1}$) is ≥100 Pa s to ≤300 Pa s (preferably ≥120 Pa s to ≤270 Pa s);
b) the Charpy impact strength (unnotched, ISO 179/1eU, 23° C.) is ≥20 kJ/m$^2$ (preferably ≥20 kJ/m$^2$ to ≤150 kJ/m$^2$);
c) the Vicat B softening temperature (ISO 306, 50 K/h, 50 N) is ≥115° C. (preferably ≥115° C. to ≤150° C.);
d) the thermal conductivity (ASTM E 1461, in plane) is ≥0.68 W/m K (preferably ≥0.7 W/m K to ≤1.5 W/m K);
e) the thermal conductivity (ASTM E 1461, through plane) is ≥0.2 W/m K (preferably ≥0.24 W/m K to ≤0.4 W/m K);
f) the rating in the UL94V fire test (1.5 mm wall thickness) is V-0;
g) the rating in the UL94-5V fire test (2.0 mm wall thickness) is VA.

In a preferred variant the composition has the property f) and at least one further property selected from a) to e) and g).

In a preferred variant the composition has the property g) and at least one further property selected from a) to f).

A further aspect of the present invention is a process for producing a composition according to the invention, comprising mixing the components A), B) C), FR) and D), wherein the talc B) employed is unsized talc and before mixing the amounts of B) and C) are matched to one another such that per 10 parts by weight of unsized talc ≥0.10 to ≤1.4 parts by weight of component C are employed, wherein the mixing of components A), B), FR) and D) comprises a mixing step of components A) and B) at a temperature above the melting temperature of the aromatic polycarbonate A) and wherein component C) is added to the mixture when components A) and B) are jointly melted.

In one embodiment the mixing is carried out in a co-kneader.

The invention likewise provides a molding comprising a thermoplastically processed composition according to the invention. The molding may consist of the composition according to the invention or else comprise a subregion of the composition, for instance due to multicomponent injection molding. The moldings according to the invention are notable for a unique combination of properties of intrinsic thermal conductivity coupled with electrical insulation, high stiffness, high toughness, especially under multiaxial stress, improved flowability and high surface quality on thermoplastic processing.

The moldings made of the compositions according to the invention are in each case thermally conductive and preferably electrically insulating.

The moldings are also suitable for applications including: vehicle parts or interior trim components for motor vehicles, buses, trucks, mobile homes, rail vehicles, aircraft, water vehicles or other vehicles, components for electrically powered vehicles, cover panels for the construction sector, two-dimensional wall elements, dividing walls, wall protection and edge protection bars, profiles for electrical installation ducts, cable guides or live rail covers.

In one embodiment the molding is a battery housing, a 2-component cooling body having an electrically conductive layer or an electronics housing.

EXAMPLES

The present invention is more particularly elucidated with reference to the following examples without, however, being limited thereto. Unless otherwise stated all reported percentages in the formulations are percentages by weight based on the total weight of the formulation. A "V" in the formulation designation indicates that the formulation is a comparative example. The employed talc B1 and B2 was unsized before processing into the polycarbonate compositions.

| | Components employed |
|---|---|
| A1 | Linear bisphenol A polycarbonate from Covestro Deutschland AG having an average molecular weight $M_w$ of about 24 000 g/mol and a softening temperature (VST/B 120 according to ISO 306: 2014-3) of 148° C. and containing no UV absorber. The melt volume flow rate (MVR) according to ISO 1133: 2012-03 is 19.0 cm$^3$/(10 min) at 300° C. and a 1.2 kg load |
| A2 | Linear bisphenol A polycarbonate from Covestro Deutschland AG having an average molecular weight $M_w$ of about 31 000 g/mol and a softening temperature (VST/B 120 according to ISO 306: 2014-3) of 150° C. and containing no UV absorber. The melt volume flow rate (MVR) according to ISO 1133: 2012-03 is 6.0 cm$^3$/(10 min) at 300° C. and a 1.2 kg load |
| A3 | Linear copolycarbonate of bisphenol-A and 4,4'-dihydroxybiphenyl (DOD) having an average molecular weight $M_w$ of about 23 000 g/mol and a softening temperature (VST/B 120 according to ISO 306: 2014-3) of 156° C. and containing no UV absorber. The melt volume flow rate (MVR) according to ISO 1133: 2012-03 is 8.5 cm$^3$/(10 min) at 300° C. and a 1.2 kg load |
| C | Propylene-maleic anhydride polymer having an average molecular weight (gel permeation chromatography in ortho-dichlorobenzene at 150° C. with polystyrene calibration) $M_w$ = 20 700 g/mol, $M_n$ = 1460 g/mol, acid number 78 mg KOH/g |
| B1 | Compacted talc having a talc content of 98% by weight, an Fe oxide content of 1.9% by weight, an Al oxide content of 0.2% by weight, ignition loss (DIN 51081/1000° C.) of 5.4% by weight, pH (according to EN ISO 787-9: 1995) of 9.15, D50 (sedimentation analysis) of 2.2 µm; BET surface area (according to to ISO 4652: 2012) 10 m$^2$/g |
| B2 | Compacted talc having a talc content of 99% by weight, an Fe oxide content of 0.4% by weight, an Fe oxide content of 0.4% by weight, ignition loss of 6.0% by weight, pH (according to EN ISO 787-9: 1995) of 9.55, D50 (sedimentation analysis) of 0.65 µm; BET surface area 13.5 m$^2$/g |
| FR1 | Anti-drip agents composed of about 50% PTFE powder (polytetrafluoroethylene), CAS No. 9002-84-0, encapsulated with 50% SAN (acrylonitrile-styrene copolymer, CAS-No. 9003-54-7), obtainable as POLYB ® FS-200 from Han Nanotech Co., Ltd. |

| Components employed | |
|---|---|
| FR2 | C4 salt (potassium perfluorobutane sulfonate), CAS No. 29420-49-3, obtainable as Bayowet ® C4 from Lanxess AG |
| FR3 | KSS salt (mixture of potassium 3-(phenylsulfonyl), CAS No. 63316-43-8, and dipotassium 3,3'-sulfonylbis(benzenesulfonate), CAS No. 63316-33-6), obtainable as potassium diphenylsulfone 3 from OQEMA GmbH |
| FR4 | OPCTS (octaphenyltetrasiloxane), CAS No. 546-56-5, obtainable as SR476 from Momentive Performance Materials GmbH |
| FR5 | BDP (mixture of aromatic oligomeric phosphates based on bisphenol A-bis(diphenyl phosphat)), CAS No. 181028-79-5, obtainable as Reofos ® BAPP from Chemtura Manufacturing UK, Ltd. |
| FR6 | Phenoxycyclophosphazene, obtainable as RABITLE ® FP-110 from Fushimi Pharmaceutical Co., Ltd. |
| D1 | Highly crystalline boron nitride powder (mix of platelets and agglomerates) having a D50 of 16 μm (laser diffraction according to ISO 13320: 2009); BET surface area (according to ISO 4652: 2012) of 8.0 $m^2/g$ |
| D2 | Synthetic precipitated barium sulfate having a pH of 5-7 and a density of 4.4 g/mL, CAS No. 7727-43-7, "Blanc Fixe" quality |
| D3 | $CaSO_4$ CAS No. 7778-18-9, obtainable from Sigma-Aldrich Chemie GmbH |
| E1 | Pigment $TiO_2$ (sized titanium dioxide), CAS No. 13463-67-7, obtainable as Kronos ® 2230 from Kronos Titan GmbH |

Test Methods

Melt volume flow rate (MVR) was determined according to ISO 1133:2012-03 at a test temperature of 300° C., mass 1.2 kg using a Zwick 4106 instrument from Zwick Roell. The abbreviation MVR stands for the starting melt volume flow rate (after 4 minutes preheating time), and the abbreviation IMVR stands for melt volume flow rate after 19 min.

Shear viscosity (melt viscosity) at 300° C. was determined according to ISO 11443:2014-04 using a Gottfert Visco-Robo 45.00 instrument.

Charpy impact strength was measured according to ISO 179/1eU:2010 on single-side injected test bars measuring 80 mm×10 mm×4 mm at 23° C.

The Vicat softening point VST/B50 as a measure of heat resistance was determined according to ISO 306:2013 on test specimens measuring 80 mm×10 mm×4 mm with a 50 N piston load and a heating rate of 50° C./h with a Coesfeld Eco 2920 instrument from Coesfeld Materialtest.

Thermal conductivity was determined on injection-molded test specimens measuring 60×60×2 $mm^3$ according to ASTM E 1461 (Nano Flash method).

Fire behavior was measured according to UL 94V on bars measuring 127 mm×12.7 mm×"mm reported in the table".

The ULSV test was performed on sheets measuring 150 mm×105 mm×2.0 mm.

Production of the Compositions

Production of the molding materials was carried out by melt mixing/melt compounding in a twin-screw extruder/a co-kneader at a melt temperature of 260-310° C. Melt mixing was particularly preferably carried out using a co-kneader and the temperature of the melt was limited to not more than 300° C.

The components B were only later added to the components A and C previously melted or dispersed in the melt. Addition of C was carried out simultaneously with or immediately after the melting of component A. The components FR, D and E were added at any desired juncture. The addition of FR and E was preferably carried out simultaneously with or immediately after the addition of C. The addition of components D was preferably carried out before or simultaneously with the addition of B. The test specimens were in each case produced by injection molding at a melt temperature of 280° C.-300° C. and a mold temperature of 85° C.-95° C.

Results

The results obtained from inventive compositions and comparative examples are recited hereinbelow.

The comparative examples V1 to V10 show that customary flame retardant combinations of FR1-FR4 in a formulation described in WO 2018/037037 provide insufficient flame retardancy: both the UL94V test at 1.5-1.0 mm and the UL94 5V test at 2.0 mm are failed. This also applies when a polycarbonate having a higher average molecular weight (A2) is employed (V2, V4, V6, V8, V10).

Reducing the amount of B1 to 25% by weight makes it possible to pass the UL94V test at 1.5 mm provided that 0.8% FR1 and 0.2% FR2 are employed (V11). However, a 5VA score in the UL94 5V test at 2.0 mm (V11) is not achieved.

This can only be achieved by addition of an appropriate amount of D2 (1, 2, 3, 4), wherein 2.5% of component D2 are not yet sufficient to achieve a reliable 5VA score (V12). The total amount of fillers (sum of components B and D) in examples 1, 2 and 4 is equal to or exceeds the amount of filler in V1 to V10.

Compared to the addition of D2 the addition of D3 does not result in an improvement in the results of the UL94 5V test (V13, V14, V15). Combinations of D2 and D3 likewise do not result in an improvement in the result of the UL94 5V test (V20, V21).

Likewise, the addition of component D1 does not have a positive effect on the result of the UL94 5V test (V16, V17, V18, V19). The combination of D1 and D2 does not result in an improvement in the result of the UL94 5V test (V22) either.

Examples 2 and 4 show that a greater amount of white pigment E1 in the formulation is permissible without losing essential properties of the molding material.

Copolycarbonates such as for example a copolycarbonate of bisphenol-A and 4,4'-dihydroxybiphenyl (DOD) can also be correspondingly flame retarded with the inventive combination of FR1, FR2 and D2 (example 5).

When the total filler amount (sum of components B and D) is further increased such as in V27, the addition of 0.8%

FR1 and 0.2% FR2 is no longer sufficient to achieve a V0 score in the UL94V test at 1.5 mm and a 5VA score in the UL94 5V test at 2.0 mm.

In this case it is preferable to add a phosphorus-containing flame retardant such as FR5 and/or FR6 instead of FR2.

Examples V23, V24 and V29 show that sole use of FR1 and FR5 in high concentrations in the absence of component D2 does not allow a 5VA score in the UL94 5V test at 2.0 mm to be achieved. Furthermore, addition of more than 7% of FR5 causes the heat resistance of the molding materials measured by Vicat softening temperature VST/B50 according to ISO 306 to fall so severely that the molding materials are no longer suitable for usage temperatures above 115° C. (V23, V24 versus V29).

A V0 score in the UL94V test at 1.5 mm and a 5VA score in the UL94 5V test at 2.0 mm are only achieved when the amount of FR5 is reduced to less than 7% and component D2 is also added (example 6).

An excessively large amount of FR5 again has a negative effect on the heat resistance of the molding materials, the results of the Charpy impact test according to ISO 179/1eU and the result of the UL94 5V test (V28).

Particularly good combinations of properties are achievable when a combination of FR1 and FR6 with component D2 is used for flame retardancy (examples 7 and 8). The heat resistance (VST/B50 according to ISO 306) in the examples is above 115° C. and a V0 score in the UL94V test at 1.5, 1.2 and even 1.0 mm as well as a 5VA score in the UL94 5V test at 2.0 mm are reliably achieved. In addition, the result of the Charpy impact test according to ISO 179/1eU is above 20 kJ/m$^2$ which represents an exceptional result for molding materials having such a total filter content.

Examples 8 and V30 show that the addition of component D2 is necessary to achieve the 5VA score in the UL94 5V test at 2.0 mm.

TABLE 1

| Component | * | V1 | V2 | V3 | V4 | V5 | V6 | V7 | V8 | V9 | V10 |
|---|---|---|---|---|---|---|---|---|---|---|---|
| A1 | % | 65.80 | | 66.30 | | 66.00 | | 65.80 | | 65.30 | |
| A2 | % | | 65.80 | | 66.30 | | 66.00 | | 65.80 | | 65.30 |
| C | % | 1.50 | 1.50 | 1.00 | 1.00 | 1.00 | 1.00 | 1.50 | 1.50 | 1.50 | 1.50 |
| B2 | % | 30.00 | 30.00 | 30.00 | 30.00 | 30.00 | 30.00 | 30.00 | 30.00 | 30.00 | 30.00 |
| FR1 | % | 0.50 | 0.50 | 0.50 | 0.50 | 0.80 | 0.80 | 0.50 | 0.50 | 0.50 | 0.50 |
| FR2 | % | 0.20 | 0.20 | 0.20 | 0.20 | 0.20 | 0.20 | | | | |
| FR3 | % | | | | | | | 0.20 | 0.20 | 0.20 | 0.20 |
| FR4 | % | | | | | | | | | 0.50 | 0.50 |
| E1 | % | 2.00 | 2.00 | 2.00 | 2.00 | 2.00 | 2.00 | 2.00 | 2.00 | 2.00 | 2.00 |

| | Method | Parameter | Unit | V1 | V2 | V3 | V4 | V5 | V6 | V7 | V8 | V9 | V10 |
|---|---|---|---|---|---|---|---|---|---|---|---|---|---|
| Melt viscosities | ISO 11443 | 300° C./s$^{-1}$ | | | | | | | | | | | |
| | | 50 | | 354 | 351 | 357 | 560 | 366 | 535 | 345 | 544 | 486 | 316 |
| | | 100 | | 309 | 305 | 299 | 502 | 313 | 480 | 299 | 511 | 444 | 274 |
| | | 200 | | 259 | 261 | 268 | 430 | 259 | 402 | 256 | 434 | 382 | 242 |
| | | 500 | | 207 | 209 | 214 | 332 | 208 | 311 | 206 | 330 | 293 | 197 |
| | | 1000 | | 166 | 172 | 175 | 262 | 168 | 246 | 167 | 256 | 228 | 162 |
| | | 1500 | | 144 | 150 | 153 | 223 | 147 | 212 | 147 | 217 | 194 | 141 |
| | | 5000 | | 73 | 91 | 89 | 119 | 88 | 117 | 82 | 102 | 111 | 86 |
| Charpy unnotched | ISO 179/1eU | 23° C. | kJ/m$^2$ | 56 | 63 | 35 | 41 | 57 | 51 | 40 | 39 | 50 | 44 |
| VICAT B | ISO 306 | 50 K/h 50N | ° C. | 144.8 | 144.1 | 144.2 | 142.9 | 143.6 | 142.7 | 144.7 | 144.4 | 144.8 | 143.8 |

| | | | V1 | V2 | V3 | V4 | V5 | V6 | V7 | V8 | V9 | V10 |
|---|---|---|---|---|---|---|---|---|---|---|---|---|
| UL94V 1.0 mm | UL94V | Class | V-not | V-not | V-not | V-not | V-not | V-not | V-not | V-not | V-not | V-not |
| UL94V 1.2 mm | UL94V | Class | V-not | V-not | V-not | V-not | V-not | V-not | V-not | V-not | V-not | V-not |
| UL94V 1.5 mm | UL94V | Class | V-1 | V-not | V-1 | V-not | V-1 | V-not | V-not | V-not | V-not | V-not |

* % by weight in each case

TABLE 2

| Component | * | V11 | V12 | V13 | 1 | V14 | 2 | V15 | 3 | V16 | V17 |
|---|---|---|---|---|---|---|---|---|---|---|---|
| A1 | % | 71.50 | 69.00 | 69.00 | 66.50 | 66.50 | 64.00 | 64.00 | 69.00 | 70.50 | 69.50 |
| C | % | 1.50 | 1.50 | 1.50 | 1.50 | 1.50 | 1.50 | 1.50 | 1.50 | 1.50 | 1.50 |
| B1 | % | 25.00 | 25.00 | 25.00 | 25.00 | 25.00 | 25.00 | 25.00 | 20.00 | 25.00 | 25.00 |
| FR1 | % | 0.80 | 0.80 | 0.80 | 0.80 | 0.80 | 0.80 | 0.80 | 0.80 | 0.80 | 0.80 |
| FR2 | % | 0.20 | 0.20 | 0.20 | 0.20 | 0.20 | 0.20 | 0.20 | 0.20 | 0.20 | 0.20 |
| D1 | % | | | | | | | | | 1.00 | 2.00 |
| D2 | % | | 2.50 | | 5.00 | | 7.50 | | 7.50 | | |
| D3 | % | | | 2.50 | | 5.00 | | 7.50 | | | |
| E1 | % | 1.00 | 1.00 | 1.00 | 1.00 | 1.00 | 1.00 | 1.00 | 1.00 | 1.00 | 1.00 |

TABLE 2-continued

| | Method | Parameter | Unit | V11 | V12 | V13 | 1 | V14 | 2 | V15 | 3 | V16 | V17 |
|---|---|---|---|---|---|---|---|---|---|---|---|---|---|
| Melt viscosities | ISO 11443 | 300° C./s$^{-1}$ | | | | | | | | | | | |
| | | 50 | Pa·s | 309 | 310 | 305 | 409 | 339 | 435 | 405 | 327 | 290 | 312 |
| | | 100 | Pa·s | 264 | 264 | 271 | 350 | 300 | 355 | 336 | 285 | 250 | 263 |
| | | 200 | Pa·s | 224 | 230 | 242 | 291 | 266 | 287 | 278 | 254 | 215 | 225 |
| | | 500 | Pa·s | 176 | 189 | 197 | 225 | 214 | 219 | 221 | 207 | 178 | 179 |
| | | 1000 | Pa·s | 146 | 153 | 162 | 179 | 175 | 179 | 180 | 164 | 148 | 145 |
| | | 1500 | Pa·s | 131 | 137 | 144 | 155 | 152 | 158 | 159 | 143 | 131 | 131 |
| | | 5000 | Pa·s | 85 | 86 | 87 | 92 | 92 | 94 | 93 | 92 | 83 | 83 |
| Charpy unnotched | ISO 179/1eU | 23° C. | kJ/m² | 152 | 120 | 88 | 103 | 68 | 66 | 41 | 164 | 87 | 73 |
| VICAT B | ISO 306 | 50 K/h 50N | ° C. | 145.0 | 144.9 | 145.5 | 145.0 | 146.0 | 143.7 | 146.0 | 144.3 | 144.9 | 144.7 |
| Thermal conductivity | ASTM E 1461 | in plane | W/mK | 0.81 | 0.83 | 0.78 | 0.86 | 0.83 | 0.84 | 0.89 | 0.73 | 0.89 | 0.96 |
| Temperature conductivity | | in plane | mm²/s | 0.558 | 0.557 | 0.528 | 0.578 | 0.559 | 0.566 | 0.585 | 0.489 | 0.581 | 0.629 |
| Heat capacity | | in plane | J/(g*K) | 1.034 | 1.045 | 1.047 | 1.000 | 1.023 | 1.006 | 1.041 | 1.038 | 1.082 | 1.084 |
| Density | | in plane | g/cm³ | 1.40 | 1.43 | 1.42 | 1.46 | 1.45 | 1.48 | 1.46 | 1.44 | 1.41 | 1.41 |
| Thermal conductivity | ASTM E 1461 | through plane | W/mK | 0.23 | 0.24 | 0.24 | 0.24 | 0.24 | 0.26 | 0.25 | 0.24 | 0.25 | 0.25 |
| Temperature conductivity | | through plane | mm²/s | 0.156 | 0.160 | 0.159 | 0.165 | 0.161 | 0.173 | 0.167 | 0.163 | 0.161 | 0.164 |
| Heat capacity | | through plane | J/(g*K) | 1.034 | 1.045 | 1.047 | 1.000 | 1.023 | 1.006 | 1.041 | 1.038 | 1.082 | 1.084 |
| Density | | through plane | g/cm³ | 1.40 | 1.43 | 1.42 | 1.45 | 1.45 | 1.48 | 1.46 | 1.44 | 1.41 | 1.41 |

| | | | | V11 | V12 | V13 | 1 | V14 | 2 | V15 | 3 | V16 | V17 |
|---|---|---|---|---|---|---|---|---|---|---|---|---|---|
| UL94V 1.0 mm | UL94V | | Class | V-1 | V-1 | V-not | V-0 | V-not | V-1 | V-not | V-0 | V-0 | V-1 |
| UL94V 1.2 mm | UL94V | | Class | V-1 | V-not | V-1 | V-0 | V-0 | V-0 | V-not | V-0 | V-1 | V-1 |
| UL94V 1.5 mm | UL94V | | Class | V-0 | V-0 | V-0 | V-0 | V-not | V-0 | V-1 | V-0 | V-0 | V-0 |
| UL5V 2.0 mm | UL94 5V | | Class | 5VB | 5VB | 5VB | 5VA | 5VA | 5VA | 5VA | 5VA | 5VB | 5VB |

* % by weight in each case

TABLE 3

| Component | * | V18 | V19 | 4 | V20 | V21 | V22 | V23 | V24 | 5 |
|---|---|---|---|---|---|---|---|---|---|---|
| A1 | % | 68.50 | 73.50 | 63.00 | 64.00 | 64.00 | 67.00 | 57.00 | 52.00 | 4.00 |
| A3 | % | | | | | | | | | 60.00 |
| C | % | 1.50 | 1.50 | 1.50 | 1.50 | 1.50 | 1.50 | 1.50 | 1.50 | 1.50 |
| B1 | % | 25.00 | 20.00 | 25.00 | 25.00 | 25.00 | 25.00 | 30.00 | 30.00 | 25.00 |
| B2 | % | | | | | | | | | |
| FR1 | % | 0.80 | 0.80 | 0.80 | 0.80 | 0.80 | 0.80 | 0.50 | 0.50 | 0.80 |
| FR2 | % | 0.20 | 0.20 | 0.20 | 0.20 | 0.20 | 0.20 | | | 0.20 |
| FR5 | % | | | | | | | 10.00 | 15.00 | |
| D1 | % | 3.00 | 3.00 | | | | 2.00 | | | |
| D2 | % | | | 7.50 | 5.00 | 2.50 | 2.50 | | | 7.50 |
| D3 | % | | | | 2.50 | 5.00 | | | | |
| E1 | % | 1.00 | 1.00 | 2.00 | 1.00 | 1.00 | 1.00 | 1.00 | 1.00 | 1.00 |

| | Method | Parameter | Unit | V18 | V19 | 4 | V20 | V21 | V22 | V23 | V24 | 5 |
|---|---|---|---|---|---|---|---|---|---|---|---|---|
| Melt viscosities | ISO 11443 | 300° C./s$^{-1}$ | | | | | | | | | | |
| | | 50 | Pa·s | 335 | 304 | 396 | 358 | 419 | 385 | 190 | 127 | 621 |
| | | 100 | Pa·s | 282 | 259 | 318 | 284 | 342 | 320 | 157 | 107 | 538 |
| | | 200 | Pa·s | 240 | 230 | 267 | 244 | 290 | 267 | 133 | 91 | 453 |
| | | 500 | Pa·s | 194 | 190 | 211 | 196 | 231 | 211 | 107 | 72 | 343 |
| | | 1000 | Pa·s | 157 | 156 | 170 | 163 | 188 | 170 | 87 | 60 | 262 |
| | | 1500 | Pa·s | 137 | 139 | 150 | 145 | 164 | 148 | 77 | 55 | 219 |
| | | 5000 | Pa·s | 85 | 85 | 90 | 87 | 97 | 88 | 48 | 38 | 117 |
| Charpy unnotched | ISO 179/1eU | 23° C. | kJ/m² | 61 | 84 | 59 | 38 | 32 | 62 | 23 | 20 | 43 |
| VICAT B | ISO 306 | 50 K/h 50N | ° C. | 144.8 | 144.9 | 143.9 | 143.4 | 143.1 | 143.9 | 103.9 | 88.2 | 149.6 |
| Thermal conductivity | ASTM E 1461 | in plane | W/mK | 1.03 | 0.84 | | | 0.90 | | | 0.97 | |

TABLE 3-continued

| | | | | | | | | | | |
|---|---|---|---|---|---|---|---|---|---|---|
| Temperature conductivity | | in plane | mm²/s | 0.685 | 0.573 | | 0.638 | | 0.654 | |
| Heat capacity | | in plane | J/(g*K) | 1.059 | 1.077 | | 0.980 | | 1.005 | |
| Density | | in plane | g/cm³ | 1.42 | 1.38 | | 1.44 | | 1.47 | |
| Thermal conductivity | ASTM E 1461 | through plane | W/mK | 0.25 | 0.24 | | 0.24 | | 0.28 | |
| Temperature conductivity | | through plane | mm²/s | 0.167 | 0.162 | | 0.169 | | 0.192 | |
| Heat capacity | | through plane | J/(g*K) | 1.059 | 1.077 | | 0.980 | | 1.005 | |
| Density | | through plane | g/cm³ | 1.42 | 1.38 | | 1.44 | | 1.47 | |

| | | | V18 | V19 | 4 | V20 | V21 | V22 | V23 | V24 | 5 |
|---|---|---|---|---|---|---|---|---|---|---|---|
| UL94V 1.0 mm | UL94V | Class | V-1 | V-1 | V-1 | V-not | V-not | V-1 | V-0 | V-0 | V-1 |
| UL94V 1.2 mm | UL94V | Class | V-0 | V-0 | V-1 | V-1 | V-not | V-1 | V-0 | V-0 | |
| UL94V 1.5 mm | UL94V | Class | V-0 | V-0 | V-0 | V-1 | V-not | V-0 | V-0 | V-0 | V-0 |
| UL5V 2.0 mm | UL94 5V | Class | 5VB | 5VB | 5VA | 5VB | 5VB | 5VB | 5VB | 5VB | 5VA |

* % by weight in each case

TABLE 4

| Component | * | V25 | V26 | V27 | 6 | V28 | V29 | 7 | 8 | V30 |
|---|---|---|---|---|---|---|---|---|---|---|
| A1 | % | 57.00 | 49.50 | 57.30 | 54.50 | 52.50 | 60.00 | 54.50 | 52.50 | 60.00 |
| C | % | 1.50 | 1.50 | 1.50 | 1.50 | 1.50 | 1.50 | 1.50 | 1.50 | 1.50 |
| B1 | % | 30.00 | 30.00 | 30.00 | 30.00 | 30.00 | 30.00 | 30.00 | 30.00 | 30.00 |
| FR1 | % | 0.50 | 0.50 | 0.50 | 0.50 | 0.50 | 0.50 | 0.50 | 0.50 | 0.50 |
| FR2 | % | | | 0.20 | | | | | | |
| FR5 | % | 10.00 | 10.00 | | 5.00 | 7.00 | 7.00 | | | |
| FR6 | | | | | | | | 5.00 | 7.00 | 7.00 |
| D2 | % | | 7.50 | 7.50 | 7.50 | 7.50 | | 7.50 | 7.50 | |
| E1 | % | 1.00 | 1.00 | 1.00 | 1.00 | 1.00 | 1.00 | 1.00 | 1.00 | 1.00 |

| | Method | Parameter | Unit | V25 | V26 | V27 | 6 | V28 | V29 | 7 | 8 | V30 |
|---|---|---|---|---|---|---|---|---|---|---|---|---|
| Melt viscosities | ISO 11443 | 300° C./s⁻¹ | | | | | | | | | | |
| | | 50 | Pa·s | 288 | 301 | 519 | 406 | 396 | 321 | 563 | 381 | 335 |
| | | 100 | Pa·s | 209 | 217 | 408 | 301 | 285 | 245 | 446 | 284 | 257 |
| | | 200 | Pa·s | 155 | 158 | 326 | 237 | 216 | 191 | 357 | 221 | 203 |
| | | 500 | Pa·s | 113 | 118 | 241 | 179 | 158 | 145 | 254 | 165 | 151 |
| | | 1000 | Pa·s | 90 | 94 | 185 | 137 | 122 | 118 | 195 | 130 | 120 |
| | | 1500 | Pa·s | 79 | 82 | 159 | 118 | 106 | 103 | 167 | 113 | 104 |
| | | 5000 | Pa·s | 49 | 49 | 90 | 64 | 62 | 61 | 93 | 65 | 61 |
| Charpy unnotched | ISO 179/1eU | 23° C. | kJ/m² | 22 | 17 | 39 | 22 | 19 | 28 | 22 | 22 | 31 |
| VICAT B | ISO 306 | 50 K/h 50N | ° C. | 104.3 | 101.1 | 145.9 | 120.4 | 112.7 | 115.4 | 116.9 | 117.0 | 118.5 |
| Thermal conductivity | ASTM E 1461 | in plane | W/mK | 0.97 | 1.05 | 1.06 | 1.10 | 1.07 | 0.98 | 1.01 | 1.01 | 1.04 |
| Temperature conductivity | | in plane | mm²/s | 0.663 | 0.722 | 0.705 | 0.692 | 0.699 | 0.660 | 0.703 | 0.703 | 0.661 |
| Heat capacity | | in plane | J/(g*K) | 0.994 | 0.929 | 0.975 | 1.020 | 0.978 | 1.029 | 0.923 | 0.923 | 1.074 |
| Density | | in plane | g/cm³ | 1.47 | 1.57 | 1.54 | 1.57 | 1.56 | 1.45 | 1.55 | 1.55 | 1.46 |
| Thermal conductivity | ASTM E 1461 | through plane | W/mK | 0.24 | 0.25 | 0.26 | 0.28 | 0.27 | 0.24 | 0.25 | 0.25 | 0.26 |
| Temperature conductivity | | through plane | mm²/s | 0.163 | 0.171 | 0.175 | 0.175 | 0.174 | 0.163 | 0.175 | 0.175 | 0.164 |
| Heat capacity | | through plane | J/(g*K) | 0.994 | 0.929 | 0.975 | 1.020 | 0.978 | 1.029 | 0.921 | 0.923 | 1.074 |
| Density | | through plane | g/cm³ | 1.47 | 1.57 | 1.54 | 1.57 | 1.56 | 1.45 | 1.57 | 1.55 | 1.46 |

| | | | V25 | V26 | V27 | 6 | V28 | V29 | 7 | 8 | V30 |
|---|---|---|---|---|---|---|---|---|---|---|---|
| UL94V 1.0 mm | UL94V | Class | V-0 | V-0 | V-not | V-1 | V-0 | V-0 | V-0 | V-0 | V-0 |
| UL94V 1.2 mm | UL94V | Class | V-0 | V-0 | V-not | V-1 | V-0 | V-1 | V-0 | V-0 | V-0 |

TABLE 4-continued

| | | | | | | | | | | | |
|---|---|---|---|---|---|---|---|---|---|---|---|
| UL94V 1.5 mm | UL94V | Class | V-0 | V-0 | V-1 | V-0 | V-0 | V-0 | V-0 | V-0 | V-0 |
| UL5V 2.0 mm | UL94 5V | Class | 5VB | 5VB | 5 V-not | 5VA | 5VB | 5VB | 5VA | 5VA | 5VB |

* % by weight in each case

The invention claimed is:

1. A thermoplastic composition, comprising:
A) at least one aromatic polycarbonate;
B) talc;
C) at least one anhydride-modified alpha-olefin polymer having an acid number of ≥30 mg KOH/g and an average molecular weight $M_W$ of ≥4000 to ≤40 000 g/mol, wherein the average molecular weight $M_W$ is determined by gel permeation chromatography in ortho-dichlorobenzene at 150° C. with polystyrene calibration and the acid number is determined by potentiometric titration with alcoholic potassium hydroxide solution according to DIN ISO 17025:2005, wherein the anhydride-modified alpha-olefin polymer C) comprises ≥90.0% to ≤98.0% by weight of alpha-olefin polymer and ≥2.0% to ≤10.0% by weight of anhydride, wherein the reported % by weight values are based on the total weight of the anhydride-modified alpha-olefin polymer and sum to ≤100% by weight;
FR) at least one organic flame retardant selected from: fluoropolymer-containing anti-drip agents, fluorinated sulfonic acid salts, organic phosphoric acid esters, phosphazenes or mixtures of at least two of the above-mentioned agents;
D) at least one inorganic compound distinct from talc;
wherein
the composition contains barium sulfate in an amount of ≥3% by weight based on the total weight of the composition;
the composition contains alkaline earth metal sulfates distinct from barium sulfate in an amount of ≥0% by weight to ≤25% by weight based on the total weight of the alkaline earth metal sulfates present in the composition;
the composition contains organic phosphoric acid esters in an amount of ≥0% by weight to ≤7.5% by weight based on the total weight of the composition and
the composition contains ≥0.5% by weight based on the total weight of the composition of fluoropolymer-containing anti-drip agents,
wherein in the case where the composition contains ≥0.1% by weight based on the total weight of the composition of fluorinated sulfonic acid salts, the content of fluoropolymer-containing anti-drip agents is ≥0.7% by weight based on the total weight of the composition.

2. The composition as claimed in claim 1, wherein the composition contains ≥3% by weight based on the total weight of the composition of organic phosphoric acid esters.

3. The composition as claimed in claim 1, wherein the composition contains ≥3% by weight based on the total weight of the composition of linear and/or cyclic phosphazenes.

4. The composition as claimed in claim 1, wherein the composition contains
≥0% by weight to ≤1% by weight based on the total weight of the composition of oligomeric organic siloxanes and/or
≥0% by weight to ≤1% by weight based on the total weight of the composition of halogen-free organic sulfones and/or halogen-free organic sulfonates and/or
≥0% by weight to ≤1% by weight based on the total weight of the composition of boron nitride.

5. The composition as claimed in claim 1, wherein the composition contains at least one polycarbonate or copolycarbonate comprising units based on bisphenol A.

6. The thermoplastic composition as claimed in claim 1, wherein the talc has a D50 value for the particle size distribution determined by sedimentation analysis of ≥0.5 to ≤10 μm.

7. The thermoplastic composition as claimed in claim 1, comprising:
A) ≥50% to ≤75% by weight of aromatic polycarbonate;
B) ≥15% to ≤35% by weight of talc;
C) ≥0.5% to ≤3% by weight of anhydride-modified alpha-olefin polymer having an acid number of ≥30 mg KOH/g and an average molecular weight $M_W$ of ≥4000 to ≤40 000 g/mol,
wherein the average molecular weight $M_W$ is determined by gel permeation chromatography in ortho-dichlorobenzene at 150° C. with polystyrene calibration and the acid number is determined by potentiometric titration with alcoholic potassium hydroxide solution according to DIN ISO 17025:2005;
FR) ≥0.7% to ≤0.9% by weight of fluoropolymer-containing anti-drip agent in combination with ≥0.1% to ≤0.3% by weight of fluorinated sulfonic acid salt; or
≥0.4% to ≤0.6% by weight of fluoropolymer-containing anti-drip agent in combination with ≥3% to ≤5% by weight of organic phosphoric acid ester; or
≥0.4% to ≤0.6% by weight of fluoropolymer-containing anti-drip agent in combination with ≥3% to ≤10% by weight of linear or cyclic phosphazene;
D) ≥3% by weight to ≤10% by weight of barium sulfate;
E) ≥0% by weight to ≤3% by weight of titanium dioxide;
wherein the reported % by weight values are based on the total weight of the composition and sum to ≤100% by weight.

8. The composition as claimed in claim 1, comprising:
A) ≥52% to ≤55% by weight of aromatic polycarbonate having an average molecular weight $M_W$ of 23 000 g/mol to 25 000, a softening temperature VST/B 120 according to ISO 306:2014-3 of 145° C. to 150° C. and a melt-volume flow rate according to ISO 1133:2012-03 of 18.0 cm³/(10 min) to 20.0 cm³/(10 min) at 300° C. and a 1.2 kg load;
B) ≥28% to ≤30% by weight of talc having a D50 value for the particle size distribution of ≥2 μm to ≤2.5 μm;
C) ≥1% to ≤2% by weight of anhydride-modified alpha-olefin polymer having an acid number of ≥75 to ≤80 mg KOH/g and an average molecular weight MW of ≥20 000 to ≤21 000 g/mol,
wherein the average molecular weight $M_W$ is determined by gel permeation chromatography in ortho-dichlorobenzene at 150° C. with polystyrene calibration and the acid number is determined by potentiometric titration with alcoholic potassium hydroxide solution according to DIN ISO 17025:2005;

FR) ≥0.4% to ≤0.6% by weight of fluoropolymer-containing anti-drip agent and ≥5% to ≤8% by weight of cyclic phosphazene;
D) ≥7% by weight to ≤8% by weight of barium sulfate;
E) ≥0% by weight to ≤1.2% by weight of titanium dioxide;
wherein the reported % by weight values are based on the total weight of the composition and sum to ≤100% by weight.

9. The composition as claimed in claim 1 having at least two of the following properties:
   a) the melt viscosity is ≥100 Pa s to ≤300 Pa s;
   b) the Charpy impact strength is ≥20 kJ/m$^2$;
   c) the Vicat B softening temperature is ≥115° C.;
   d) the thermal conductivity is ≥0.68 W/m K;
   e) the thermal conductivity is ≥0.2 W/m K;
   f) the rating in the UL94V fire test is V-0;
   g) the rating in the UL94-5V fire test is VA.

10. A process for producing a composition as claimed in claim 1, comprising mixing the components A), B) C), FR) and D),
wherein
the talc B) employed is unsized talc,
before mixing the amounts of B) and C) are matched to one another such that per 10 parts by weight of unsized talc ≥0.10 to ≤1.4 parts by weight of component C are employed,
wherein the mixing of components A), B), FR) and D) comprises a mixing step of components A) and B) at a temperature above the melting temperature of the aromatic polycarbonate A) and
wherein component C) is added to the mixture simultaneously with or immediately after the melting of component A).

11. The process as claimed in claim 10, wherein the mixing is carried out in a co-kneader.

12. A molding comprising a thermoplastically processed composition as claimed in claim 1.

13. The molding as claimed in claim 12, wherein the molding is a battery housing, a 2-component cooling body having an electrically conductive layer or an electronics housing.

* * * * *